March 12, 1968     E. M. WALLACE ET AL     3,372,478

LOPPING SHEARS WITH A COMPOUND ACTION

Filed Sept. 20, 1965     2 Sheets-Sheet 1

INVENTORS.
EDWARD M. WALLACE
WALLACE M. PRESTON

BY

ATTORNEY.

March 12, 1968   E. M. WALLACE ET AL   3,372,478
LOPPING SHEARS WITH A COMPOUND ACTION
Filed Sept. 20, 1965   2 Sheets-Sheet 2

INVENTION

INVENTORS.
EDWARD M. WALLACE
WALLACE M. PRESTON
BY
Kenwood Rosa
ATTORNEY.

United States Patent Office 3,372,478
Patented Mar. 12, 1968

3,372,478
LOPPING SHEARS WITH A COMPOUND ACTION
Edward M. Wallace, Longmeadow, and Wallace M. Preston, West Springfield, Mass., assignors to Wallace Mfg. Corp., West Springfield, Mass., a corporation
Filed Sept. 20, 1965, Ser. No. 488,329
1 Claim. (Cl. 30—193)

ABSTRACT OF THE DISCLOSURE

Lopping shears incorporating a compound mechanism for maintaining a cutting jaw and an anvil jaw in the same plane comprising, a cutting jaw, an anvil jaw and an anvil on the anvil jaw having a bearing surface in line contact with the cutting edge of the cutting jaw in shear-closed position, wherein the cutting an anvil jaws are disposed predominantly in the same plane, and wherein a floating jaw pivot pivotally interconnects the cutting jaw and anvil jaw at their respective rearward portions, there being additionally a pair of handle levers having forwardly-projecting portions and a handle pivot pivotally interconnecting the handle levers in a scissor-like formation independent of and forwardly of the jaw pivot, with the forwardly projecting portion of each handle lever being located in juxtaposition to one of the jaws and a pair of pintle means each interconnecting one of the jaws and the forwardly-projecting portion of the respective juxtaposed one of the handle levers.

---

This invention relates to improvements and structural refinements in a lopping shear.

Lopping shears of the common types available today and known in the prior art each comprise a pair of crossed blade-handle levers held together by means of a single pivot. A primary disadvantage in these constructions lies in the great effort required when cutting heavy growths. It is possible to increase the leverage for cutting by utilizing extra long handles, but this adds to the weights and costs of such a shear as well as making such a tool more unwieldy and tiring in its use.

With continued reference to the prior art, shears each embodying more than a single pivot and having a compound leverage have been introduced for the purpose of providing more leverage and hence easier cutting. Such a shear consists of a pair of pivotally interconnected handles and a pair of pivotally interconnected blades. It has been necessary to produce such a shear with the blade pivot located closely adjacent the critical area where a heavy workpiece would be placed, the theory being that maximum leverage, and hence easiest cutting, is obtained as close as possible to the blade pivot. Such theory proves faulty in practice. Firstly, it is not possible to place heavy growths close to the blade pivot because of space limitations. Secondly, there is a tendency for the blades to exude the workpiece.

Prior art loppers of the compound leverage type have been deficient in another important respect. The cutting blades have been positioned in separate planes so that, when cutting heavy growths, the blades tend to twist with respect to each other, a condition which impedes the cutting function and also acts to overload and sometimes to damage the blade pivot.

There has thus been an obvious need for a lopping shear which, not only will provide added leverage to give a more powerful horizontal force to the cutting blades without objectionable increase in the overall weight of the shear, but also will eliminate the twisting effect on the blades so common to prior art shears.

With these attendant problems in mind, we provide herein a multiple pivot type of lopping shear wherewith extra leverage is imparted to a cutting jaw and an anvil jaw so as to effect easy shearing, wherewith the cutting jaw and anvil jaw are disposed predominantly in the same plane to preclude the possibility of any twisting thereof, and further wherewith the included angle between the cutting and anvil jaws is appreciably decreased to the end that slippage during cutting is minimized and wherewith the pivots are so related that heavy growths can be accommodated.

Lopping shears made in accordance with the invention are relatively simple and inexpensive to produce, are light in weight, require minimum effort in operational use, and are so constructed as to allow long service.

The characteristic features which we consider to be novel with our invention will be better understood from a consideration of the following detailed description forming a part of this specification, when read in conjunction with the illustrations in the accompanying drawings, wherein like characters of reference are employed to designate like to corresponding parts throughout the several views, and in which.

Figure 1:
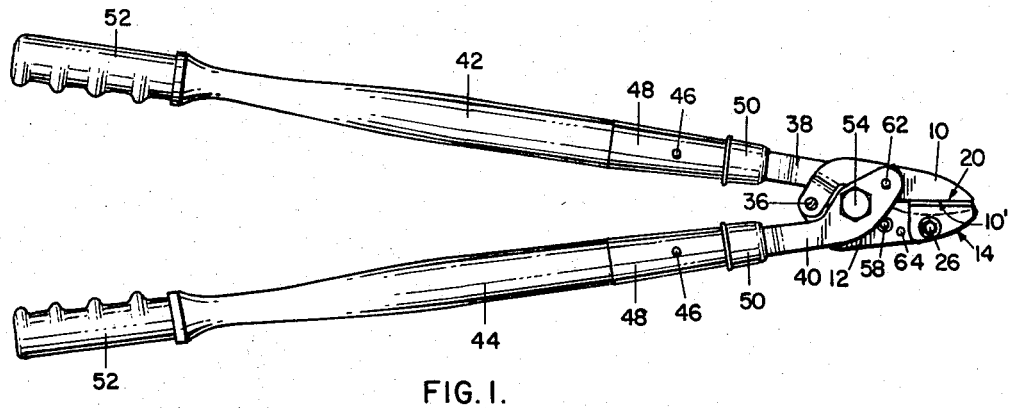
FIG. 1 is a top plan view of a shear constructed according to a preferred form of the invention, showing the cutting jaw and anvil jaw in closed position.
Figure 2:
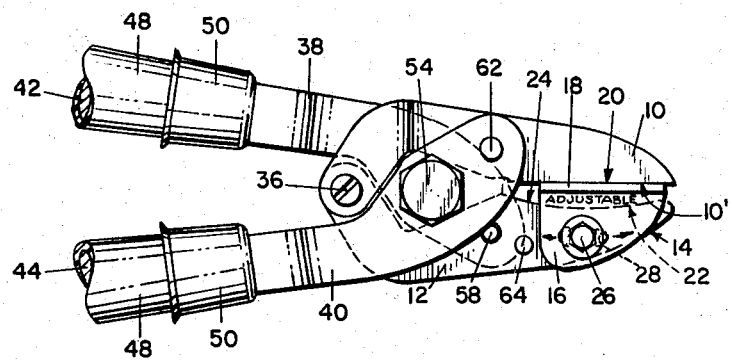
FIG. 2 is a fragmentary top plan view of certain of the operating instrumentalities of the shear of FIG. 1, again showing the cutting jaw and anvil jaw in closed position, but on an enlarged scale.
Figure 3:
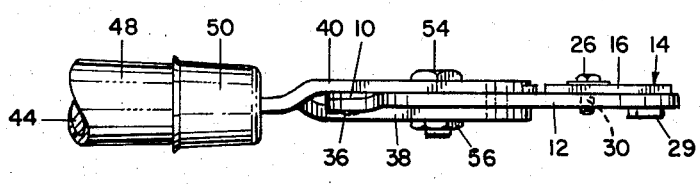
FIG. 3 is a side elevational view of the shear of FIG. 2.

In the following detailed description, for purposes of orientation, the rearward end of the shear will be understood to be to the left and the forward end of the shear will be understood to be to the right in the various figures.

With continued reference now to the exemplification, for the purpose of disclosure, we have shown a cutting jaw 10 and an anvil jaw 12, with the cutting jaw being provided with a cutting edge 10' in usual manner, and with the anvil jaw being provided with an anvil 14 having a face 20 against which the cutting edge may be seated, and with the cutting and anvil jaws being disposed predominantly in the same plane.

Anvil 14 is adjustably and releasably mounted on anvil jaw 12 and includes a mounting plate 16 having an integral anvil bar 18 extending laterally inwardly from one planar edge. The anvil bar is of greater length than the mounting plate so as to extend rearwardly therefrom, for purposes to appear, and has a substantially flat outwardly-facing planar face 20 and an inwardly-facing convex face 22, said convex face being substantially complemental to an outwardly-facing concave face 24 of anvil jaw 12.

When mounting plate 16 is disposed flush against the planar face of the anvil jaw, convex face 22 of the anvil bar rests on the concave face of the anvil jaw, the two faces being substantially coextensive.

Anvil 14 may be releasably fixed to anvil jaw 12 as by a bolt 26 passing freely through an arcuate slot 28 provided in mounting plate 16 and threaded at its innermost end in an appropriately aligned opening 30 provided in the anvil jaw.

Figure 7:
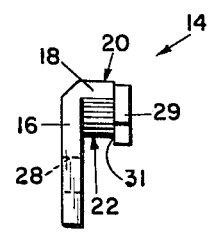
FIG. 7 is an end elevational view of the anvil of FIG. 6, as seen from the right thereof.

Anvil 14 is provided on its innermost planar face, with a somewhat arcuate keeper button 29, having a portion thereof which extends below the plane of convex face 22 to define a slot 31, see FIG. 7, in which the forward extremity of anvil jaw 12 is receivable. The keeper button serves to preclude movement of the anvil bar when the shears are subjected to heavy compressive forces.

Line contact between cutting edge 10' of cutting jaw 10 and planar face 20 of anvil bar 18, in the closed position of the shear, is attained by a loosening of bolt 26 and a sliding of anvil 14 forwardly or rearwardly, as appropriate, with convex face 22 of the anvil bar riding along and relative to concave face 24 of the anvil jaw. Proper line contact obtained, bolt 26 may then be tightened so as to lock anvil 14 in desired position.

Anvil 14 may be provided with suitable indicia delineated thereon, such as at 32 and 34, for indicating the anvil adjustability to the user, such feature being especially desirable in order to compensate for wear in the cutting jaw and/or anvil bar experienced with normal use.

Cutting jaw 10 and anvil jaw 12 are pivotally interconnected adjacent their rearwardmost extremities by a jaw pivot 36, with the said rearwardmost extremities being so offset that, when one overlaps the other, the cutting jaw and anvil jaw are disposed predominantly in the same plane.

Handle-receiving members, designated by 38 and 40, allow shanks adapted to receive at their rearward ends grasping handles 42 and 44 respectively, the grasping handles being fixed to said shanks as by pins 46 and having metal sleeves 48 and ferrules 50 sleeved thereon to give added strength to the construction.

The handles may be of any desired or conventional design, one being a primary handle, such as 42, and one being a secondary handle, such as 44, with the handles being provided with cushion grips 52 at their rearwardmost free ends to insure a positive non-slip grasp by the user.

A handle pivot, disposed forwardly of the pivotal connection 36 of the cutting jaw and anvil jaw, is provided in the form of a stud or bolt 54, extendable through aligned openings in handle-receiving members 38 and 40, said stud or bolt extending in loose-fitting manner through the opening in handle-receiving member 40 and being threaded in the opening in handle-receiving member 38, there being a nut 56 threadedly engaged thereupon in conventional manner.

The handle pivot will be observed to be disposed in vertically-disposed spaced-parallelism to the main axis of jaw pivot 36.

Handle-receiving members 38 and 40 are offset so as to facilitate the asymmetry of the construction, to allow the disposition of handles 42 and 44 in a single generally-horizontal plane, as shown, and further to provide a forwardmost portion of each located adjacent the respective cutting jaw and anvil jaw which it serves. In other words, each handle-receiving member is a counterpart of the other except that the shanks thereof are bent in opposite directions wherefore, when the lopping shear is assembled, the handles extend outwardly in the same plane from the median line of the shear and in opposite directions.

Figure 5:
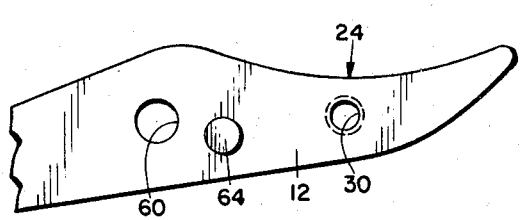
FIG. 5 is a greatly enlarged fragmentary top plan view of the forward extension of the anvil jaw of the shear of the invention.
Figure 6:
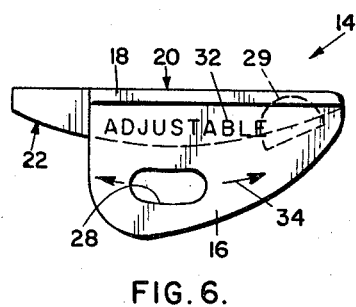
FIG. 6 is a greatly enlarged fragmentary top plan view of the anvil of the shear of the invention.

Handle-receiving member 38 has, near its forwardmost extremity and forwardly of handle pivot 54, a pivot or pintle pin 58 secured thereto by any suitable means to allow an extremity to extend outwardly from the inner planar surface thereof, the said extremity being pivotally receivable in an appropriately-aligned vertically-disposed opening 60 extending through anvil jaw 12, as shown in FIG. 5.

Handle-receiving member 40 has, near its forwardmost extremity and forwardly of handle pivot 54, a pivot or pintle pin 62 secured thereto by any suitable means to allow an extremity to extend outwardly from the inner planar surface thereof, the said extremity being pivotally receivable in an appropriately-aligned vertically-disposed opening extending through cutting jaw 10.

Figure 4:
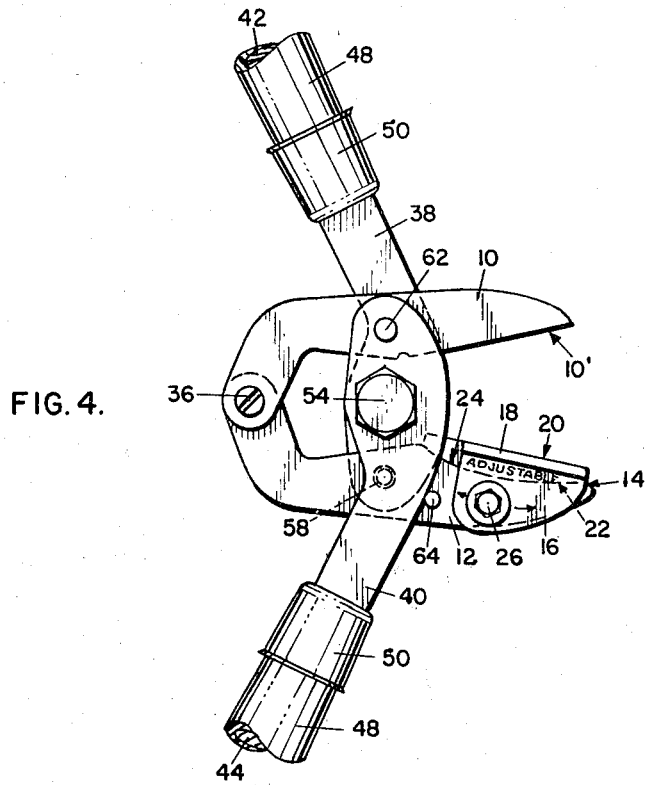
FIG. 4 is a fragmentary top plan view of the shear of FIG. 2, with the cutting jaw and anvil jaw in opened position.

Anvil jaw 12 has, forwardly of pivot or pintle pin 58, a stud 64 which may be suitably secured thereto so as to allow an extremity to extend outwardly from the inner planar surface thereof, said extremity upon contact with a side edge of handle-receiving member 40 limiting the extent of opening movement of the cutting and anvil jaws, as shown in FIG. 4.

In a definite sense, jaw pivot 36 serves as a floating pivot in the respect that it changes its position relative to handle pivot 54 during opening and closing movements of the cutting and anvil jaws and changes its position relatively to pivot or pintle pins 58 and 62.

Thus, what we have provided here is a compound shear having a cutting jaw and an anvil jaw pivotally interconnected at their respective rearward portions and being operative in predominantly the same plane, in combination with handles pivotally interconnected at their respective forward portions and being operative in predominantly the same plane, wherein a jaw pivot constitutes the pivotal interconnection between the cutting and anvil jaws, and further wherein a handle pivot independent of and forwardly of the jaw pivot constitutes the pivotal interconnection between the handles, with one handle at its forward portion being located outwardly of the cutting jaws and the other handle at its forward portion being located outwardly of the anvil jaw, all in combination with pintle means fixed to the inner surface of one handle at a forward portion thereof for rotative cooperation with the cutting jaw and pintle means fixed to inner surface of the other handle at a forward portion thereof for rotative cooperation with the anvil jaw, wherein the pintle means are disposed closely adjacent the working edges of the cutting and anvil jaws wherefor a work piece being cut is drawn into the jaws rather than expelled outwardly therefrom by reason of the fact that the cutting edge and anvil bar remain in substantial parallelism regardless of the position of the handles.

Figure 8:
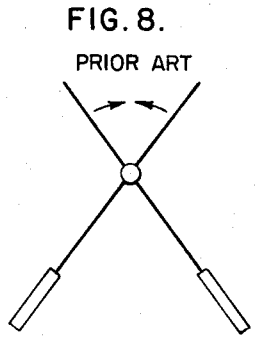
FIG. 8 is a schematic diagram of a typical prior art shear, exemplifying by a top plan view, the pivotal engagement between the handles, cutting blade and anvil blade.

As illustrated schematically in FIG. 8, a prior art shear utilizes a single pivot to interconnect the handles to its blades. Such construction seriously limits the size of the growth which can be cut and serves to expell the growth from between the blades as the handles are closed.

Figure 8A:
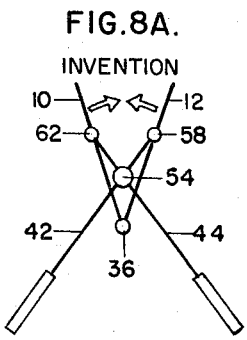
FIG. 8A is a schematic diagram of the shear of the invention, exemplifying by a top plan view, the pivotal engagement between the handles, cutting jaw and anvil jaw.

FIG. 8A, in contradistinction, illustrates the shear of the invention whereby the compound action increases the cutting edge contact pressure. Such construction utilizes both the handle and pintle means for augmenting edge contact and permits the jaws to be opened wider to accept heavier growths.

It is believed that the gist of the invention will be clearly understood from the foregoing disclosure and that, accordingly, further analysis is unnecessary, we having, in accordance with the provisions of the patent statutes, described the construction and principle of operation of our invention with reference to an exemplification which we believe to represent a best embodiment, all to the end that others, by applying current knowledge, can readily adapt the essential characteristics of its generic and/or specific aspects to other applications.

The embodiments of the invention, in which an exclusive property or privilege is claimed, are defined as follows:

1. Compound action lopping shears imparting force in a horizontal plane comprising, a cutting jaw, an anvil jaw, said jaws being operative in the same horizontal plane, an anvil adjustably secured to said anvil jaw and having a work-engaging face, said cutting jaw having a cutting edge normally disposed in line contact with the work-engaging face of said anvil, a floating jaw pivot extendable in a plane transverse to the named horizontal plane and interposed between and pivotally interconnecting the rearward portions of the respective of said cutting jaw and said anvil jaw, a pair of handle levers each having a handle extension and a forwardly projecting portion, a handle pivot independent of and forwardly of said jaw pivot and extendable through aligned openings in the forwardly projecting portions of the handle levers of said pair thereof in a plane transverse to the named horizontal plane and constituting the pivotal interconnection between the handle levers of said pair thereof and the handle extensions thereof independent of and forwardly of said jaw pivot, one of the handle extensions of said pair thereof at its forward portion being located above one of said jaws and the other of the handle extensions of said pair thereof at its forward portion being located below the other of said jaws, a cutting jaw pintle means interconnecting said cutting jaw and the forwardly projecting portion of one of the handle levers of said pair thereof forwardly of said handle pivot and a anvil jaw pintle means interconnecting said anvil jaw and the forwardly projecting portion of the other of the handle levers of said pair thereof forwardly of said handle pivot, said cutting jaw pintle means and said anvil jaw pintle means and said handle pivot and said jaw pivot conjointly maintaining the cutting edge of said cutting jaw and the work-engaging face of said anvil substantially parallel in all positions of the handle levers of said pair thereof.

References Cited
UNITED STATES PATENTS

| | | | |
|---|---|---|---|
| 2,073,460 | 3/1937 | Vosbikian et al. | 30—252 |
| 1,459,612 | 6/1923 | Buker | 30—175 X |
| 2,528,815 | 11/1950 | Boyer | 30—193 X |
| 3,187,430 | 6/1965 | Wallace et al. | 30—252 |

OTHELL M. SIMPSON, *Primary Examiner.*

WILLIAM FELDMAN, J. C. PETERS,
*Assistant Examiners.*